United States Patent [19]

Burke

[11] Patent Number: 5,575,484
[45] Date of Patent: Nov. 19, 1996

[54] FLUID PRESSURE ACTIVATED PISTON RETURN SPRING SEAL

[75] Inventor: John A. Burke, Rocky River, Ohio

[73] Assignee: Greene, Tweed of Delaware, Inc., Wilmington, Del.

[21] Appl. No.: 497,097

[22] Filed: Jun. 30, 1995

[51] Int. Cl.⁶ .................................................. F16J 15/32
[52] U.S. Cl. ........................ 277/27; 277/205; 188/72.4; 188/370
[58] Field of Search ............................ 277/27, 152, 205; 188/72.4, 72.5, 370

[56] References Cited

U.S. PATENT DOCUMENTS

| | | | |
|---|---|---|---|
| 2,319,392 | 5/1943 | Dick | 277/205 |
| 2,884,291 | 4/1959 | Whitten | 277/205 |
| 2,938,609 | 5/1960 | Burnett . | |
| 3,377,076 | 4/1968 | Burnett . | |
| 3,508,736 | 4/1970 | Rhodes et al. | 277/205 |
| 3,582,094 | 6/1971 | Whittaker . | |
| 3,915,461 | 10/1975 | Gautier . | |
| 4,189,160 | 2/1980 | Hasegawa et al. | 277/205 |
| 4,193,481 | 3/1980 | Wunderlich . | |
| 4,229,013 | 10/1980 | Burke et al. . | |
| 4,342,463 | 8/1982 | Burke . | |
| 4,345,771 | 8/1982 | Hasegawa et al. | 277/205 |
| 4,352,498 | 10/1982 | Burke et al. . | |
| 4,387,901 | 6/1983 | Ritsema . | |
| 4,417,503 | 11/1983 | Izumi | 277/205 |
| 4,858,516 | 8/1989 | Klein | 277/205 |
| 5,076,593 | 12/1991 | Sullivan et al. . | |
| 5,328,178 | 7/1994 | Nies | 277/205 |
| 5,431,415 | 7/1995 | Millonig et al. . | |
| 5,482,296 | 1/1996 | Peppiatt et al. | 277/205 |

FOREIGN PATENT DOCUMENTS

| | | | |
|---|---|---|---|
| 2263012 | 7/1973 | Germany | 277/205 |
| 42562 | 2/1994 | Japan | 188/72.4 |

*Primary Examiner*—Scott Cummings
*Attorney, Agent, or Firm*—Panitch Schwarze Jacobs & Nadel, P.C.

[57] ABSTRACT

An improved fluid pressure activated piston return spring seal element is installed in a piston housing annular groove having first and second radial side walls, an axial base wall, and a mouth. The element is annular, formed of an elastomeric material, and has an axis, first and second radial faces, and an axial face. The first radial face faces toward the first side wall, defines an inwardly extending crotch region, and includes a base wall pressure sealing lip. The axial face faces toward and protrudes through the groove mouth and includes a piston pressure sealing lip and first and second angled surfaces. The element has a body portion, a first branch extending axially from the body portion toward the first radial face and having the piston pressure sealing lip, a second branch extending axially from the body portion toward the first radial face and having the base wall pressure sealing lip, and a third branch extending radially from the first branch end toward the second branch end and defining a portion of the first radial face. The body portion and the first, second, and third branches define the crotch region.

9 Claims, 1 Drawing Sheet

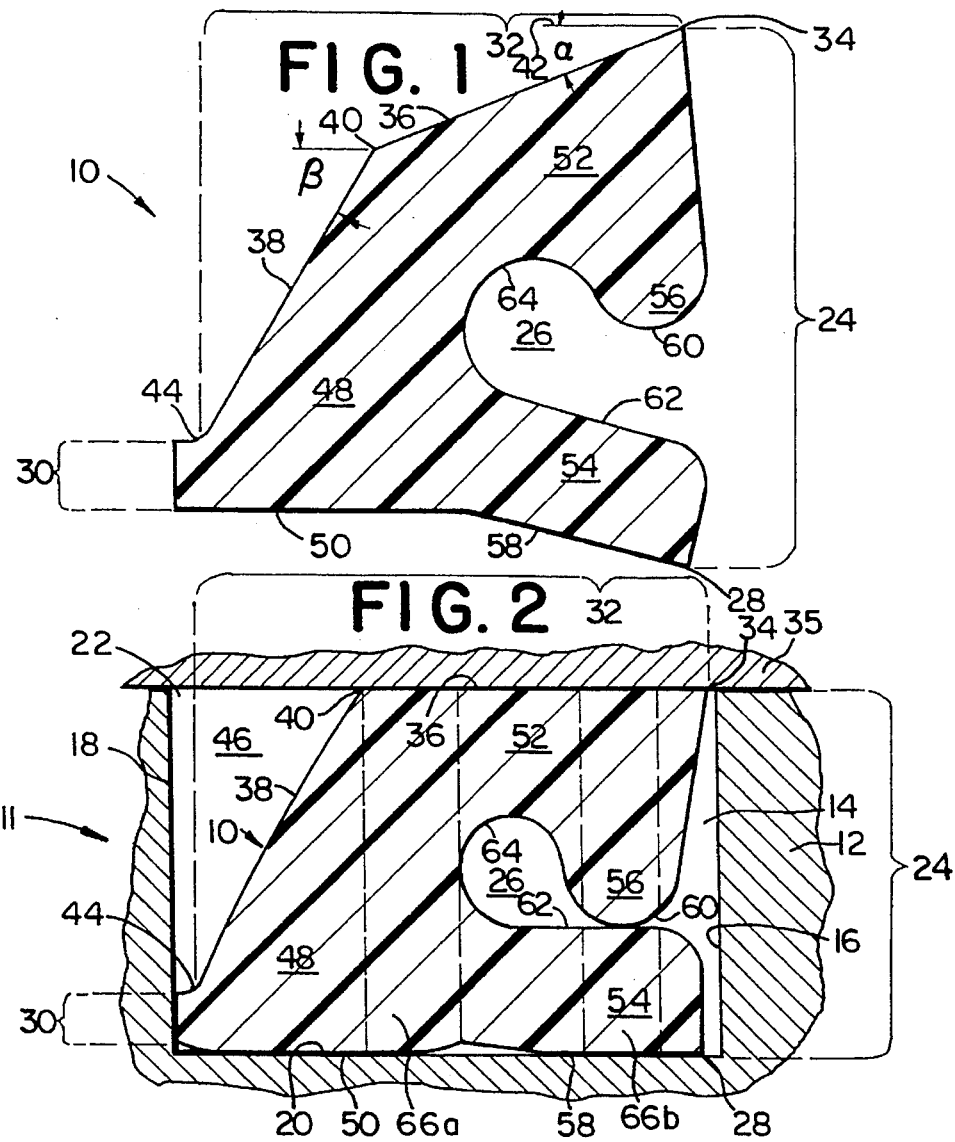
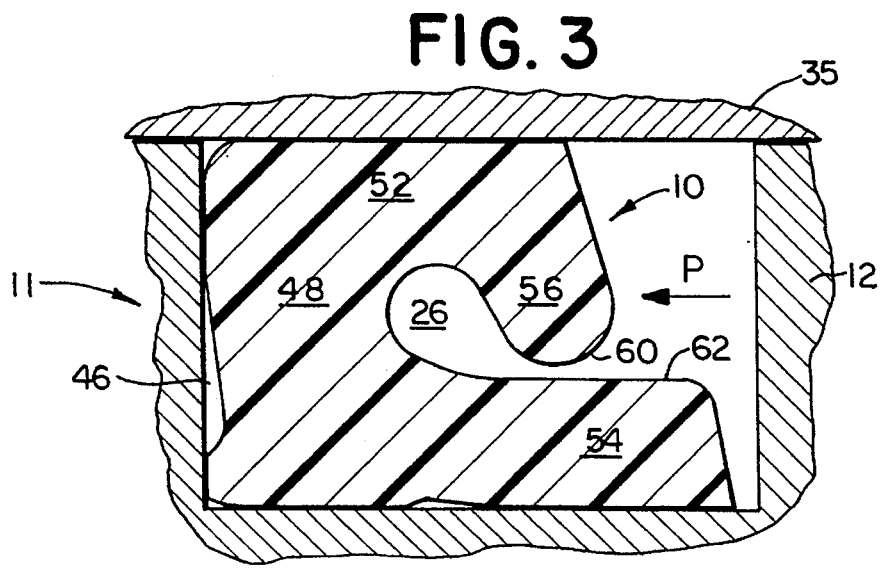

FLUID PRESSURE ACTIVATED PISTON RETURN SPRING SEAL

BACKGROUND OF THE INVENTION

The present invention relates generally to spring seals, and more particularly, to a fluid pressure activated piston return spring seal that may be employed in a disk brake braking system to achieve increased piston bore stroke.

In disk brake braking systems, pressure is typically applied to a piston by way of a braking fluid and the piston moves a brake lining into contact with a brake disk to retard rotational movement. As should be understood, it is necessary to provide a biasing device to return the piston and the brake lining from the pressurized braking position to a relaxed position. As can be seen from U.S. Pat. Nos. 4,229,013 and 4,342,463, hereby incorporated by reference, it is known to provide a spring seal assembly having a seal element which (1) seals the braking fluid, (2) grips the piston and becomes deflected when the piston and spring seal assembly are pressurized by the fluid and move to provide braking action, and (3) provides a biasing force to retract the piston and move the piston to its initial position when the fluid pressure is removed. Accordingly, the piston and the associated lining are withdrawn a sufficient distance to prevent the lining from remaining in contact with the brake disk and to allow free rotational movement of the brake disk.

However, a spring seal assembly as described in the aforementioned references has a serious disadvantage in that the deflection of the seal element and the resultant stroke of the piston are limited. More specifically, since the seal element in toroidal cross-section has a generally planar pressure side or face, the maximum deflection of the seal element and the resultant maximum bore stroke of the piston is approximately 10 percent of the seal cross-section, a value too small to meet brake system performance requirements under some circumstances.

In an effort to increase the seal element deflection and piston stroke of the aforementioned spring seal assembly, the dimensions of the seal element in toroidal cross-section were proportionally increased. However, the increased size seal element required increased fluid pressure for full piston deflection operation and otherwise did not provide adequate increased deflection and piston stroke.

A need exists, then, for a spring seal assembly having a seal element with increased deflection and providing increased piston stroke while still maintaining a reliable seal. More particularly, a need exists for a spring seal assembly having a seal element with a toroidal cross-sectional shape that allows a pressurized piston to deflect a relatively large distance of about 0.120 inches or more from an un-pressurized initial position and that provides sufficient biasing force to return the piston to the initial position when the pressure is removed.

SUMMARY OF THE INVENTION

The aforementioned need is satisfied by an improved fluid pressure activated piston return spring seal element for installation in an annular groove within a piston housing. In toroidal cross-section, the annular groove has first and second generally parallel radial side walls, an axial base wall extending between the first and second side walls, and a mouth. The spring seal element is formed of an elastomeric material and has a generally annular shape, an axis, first and second radial faces, and an axial face.

In a preferred embodiment, the first radial face faces toward the first side wall, defines a pressure side of the element and an inwardly extending crotch region, and includes a base wall pressure sealing lip for sealingly engaging the base wall. The second radial face is situated opposite the first radial face and faces the second side wall. The axial face faces toward and partially protrudes through the mouth of the groove.

The axial face includes a piston pressure sealing lip and first and second angled surfaces. The piston pressure sealing lip is positioned outside the groove proximate the first radial face and sealingly engages a piston positioned in the housing across the mouth of the groove. The first angled surface extends at a first angle with respect to the axis of the element from the piston pressure sealing lip in a direction generally toward the second radial face to an intermediate point proximate the mouth of the groove. The second angled surface extends at a second angle with respect to the axis of the element from the intermediate point in a direction generally toward the second radial face. The second angle is larger than the first angle.

The spring seal element has a body portion and first, second, and third branches. The first branch extends axially from the body portion toward the first radial face, defines at least a portion of the axial face, and has the piston pressure sealing lip. The second branch extends axially from the body portion toward the first radial face, and has the base wall pressure sealing lip. The third branch extends radially from the end of the first branch toward the end of the second branch and defines at least a portion of the first radial face. The body portion and the first, second, and third branches define the crotch region extending inwardly with respect to the element from the first radial face.

BRIEF DESCRIPTION OF THE DRAWING

The foregoing summary, as well as the following detailed description of preferred embodiments of the invention, will be better understood when read in conjunction with the appended drawing. For the purpose of illustrating the invention, there is shown in the drawing an embodiment which is presently preferred. It should be understood, however, that the invention is not limited to the precise arrangements and instrumentalities shown. In the drawing:

FIG. 1 is a toroidal cross-sectional view of a seal element employed in a preferred embodiment of a spring seal assembly in accordance with the present invention;

FIG. 2 is a toroidal cross-sectional view of the seal element shown in FIG. 1 positioned within a seal gland and compressed by a piston extending across the mouth of the gland to form the spring seal assembly; and FIG. 3 is a view similar to FIG. 2 showing the spring seal assembly of FIG. 2 under fluid pressure.

DETAILED DESCRIPTION OF PREFERRED EMBODIMENT

Certain terminology may be used in the following description for convenience only and is not limiting. The words "left", "right", "upper" and "lower" designate directions in the drawings to which reference is made. The words "inwardly" and "outwardly" are further directions toward and away from, respectively, the geometric center of the referenced element. The terminology includes the words above specifically mentioned, derivatives thereof, and words of similar import.

Referring to the drawing in detail, wherein like numerals are used to indicate like elements throughout, there is shown in FIG. 1 a seal element 10 constructed in accordance with a preferred embodiment of the present invention, where the seal element 10 exhibits an as-molded shape. As should be understood, the seal element 10 is generally annularly shaped and is formed from an elastomeric material. Preferably, the elastomeric material comprises a rubber material.

As previously stated, a disk brake represents a typical environment in which the seal element 10 of the present invention may be incorporated to form a spring seal assembly 11 (as seen in FIG. 2). The brake is conventional and per se forms no part of the present invention. A general description of the disk brake may be found in either of U.S. Pat. Nos. 4,229,013 or 4,342,463.

Referring now to FIG. 2, it may be seen that the spring seal assembly 11 includes a piston housing 12 having a seal gland or groove 14. More particularly, the groove 14 has in toroidal cross-section first and second generally parallel radial side walls 16, 18 and an axial base wall 20 that extends between the first and second side walls 16, 18. The groove 14 is generally open and has a mouth 22 opposite the base wall 20.

With reference to FIGS. 1 and 2, the seal element 10 has a first radial face 24 that faces toward the first side wall 16 when the seal element 10 is positioned within the groove 14. The first radial face is the pressure side of the seal element 10 and accordingly, when employed in a disk brake braking system, is exposed to fluid pressure from a braking fluid (not shown). As should be understood, the braking fluid may typically be a liquid such as hydraulic brake fluid, hydraulic oil, or conventional engine oil, or a gas such as compressed air. However, it will be recognized that other fluids, such as water, for example, may be employed without departing from the spirit and scope of the present invention.

The first radial face 24 of the seal element 10 defines a crotch region or crotch 26 that extends into the seal element 10 and a base wall pressure sealing lip 28 that sealingly engages the base wall 20 to seal the braking fluid in the piston housing 12 and prevent the fluid from moving past the seal element 10 along the base wall 20. The structure and function of the crotch 26 will be further described below.

The seal element 10 also has a second radial face 30 opposite the first radial face 24 and facing the second side wall 18. Preferably, and as seen in FIG. 2, the second side wall 18 extends a first distance from the base wall 20 to the mouth 22 of the groove 14, and the second radial face 30 extends a second distance from the base wall 20 toward the mouth 22 of the groove 14, such that the second distance is relatively short as compared with the first distance, on the order of 15 to 20 percent. Accordingly, when the seal element 10 is installed within the groove 14, the second radial face 30 of the seal element 10 engages the second side wall 18 of the groove 14 adjacent the base wall 20 and functions to stabilize the seal element 10 during pressurization and deflection.

The seal element 10 also has an axial face 32 that faces toward and partially protrudes through the mouth 22 of the groove 14. As more clearly seen in FIG. 1, the axial face 32 has a piston pressure sealing lip 34 that engages a piston 35 (shown in FIG. 2) positioned within the housing 12 and across the mouth 22 of the groove 14 when the seal element 10 is installed in the groove 14. More particularly, the piston pressure sealing lip 34 sealingly engages the piston 35 to prevent the braking fluid in the piston housing 12 from moving past the seal element 10 along the piston 35.

Additionally, the piston pressure sealing lip 34 grips and moves with the piston 35 when the piston 35 and the seal assembly 11 are pressurized by the braking fluid. Preferably, and as seen in FIGS. 1 and 2, the piston pressure sealing lip 34 is proximate the first radial face 24. More preferably, the axial face 32 and the first radial face 24 meet at the piston pressure sealing lip 34.

As best seen in FIG. 1, the axial face 32 also has first and second angled surfaces 36, 38. The first angled surface 36 extends from the piston pressure sealing lip 34 in a direction toward the second radial face 30 and to an intermediate point 40. More particularly, when the seal element 10 is not installed within the groove 14 and is not compressed by the piston 35, the first angled surface 36 extends at an angle $\alpha$ with respect to a line 42 parallel to the axis (not shown) of the seal element 10. Typically, the angle $\alpha$ ranges between about 15 and 30 degrees, although it is preferable that the angle $\alpha$ be about 22 degrees.

As should be understood from FIGS. 1 and 2, when the seal element 10 is positioned within the groove 14 and the piston 35 is not present (not shown), the piston pressure sealing lip 34 and at least a portion of the first angled surface 36 extend outside the groove 14 and the intermediate point 40 is proximate the mouth 22 of the groove 14 and just outside the groove 14. Accordingly, when the piston 35 is positioned within the groove 14 and compresses the seal element 10 toward the base wall 20 of the groove 14, the first angled surface 36 substantially completely contacts and firmly engages the piston 35 and grips the piston 35 along with the piston pressure sealing lip 34.

Referring again to FIG. 1, the second angled surface 38 of the axial face 32 extends from the intermediate point 40 and in a direction generally toward the second radial face 30. More particularly, when the seal element 10 is not installed within the groove 14 and is not compressed by the piston 35, the second angled surface 38 extends at a second angle $\beta$ with respect to a line parallel to the line 42 and parallel to the axis of the seal element 10. Preferably, and as seen in FIG. 2, when the piston 35 compresses the seal element 10 toward the base wall 20 of the groove 14, the angle $\beta$ does not appreciably change. Typically, the angle $\beta$ ranges between about 50 and 70 degrees, although it is preferable that the angle $\beta$ be about 60 degrees.

Preferably, and as seen in FIG. 2, the second angled surface 38 extends from the intermediate point 50 substantially to the second radial face 30 to a terminus 44 that is adjacent the second side wall 18. As may be seen, then, a relatively large, generally wedge-shaped spring gap 46 opening toward the mouth 22 of the groove 14 is formed between the second angled surface 38 and the second side wall 18.

When sufficient fluid pressure (P) is applied to the piston 35 and the pressure side or first radial face 24 of the seal element 10, the piston 35 is displaced and the piston pressure sealing lip 34 and the first angled surface 36 are moved or deflected from a relaxed position as shown in FIG. 2 to a pressurized position as shown in FIG. 3, the spring gap 46 substantially closes, the second angled surface 38 substantially completely contacts the second side wall 18, and the elastomeric material that forms the seal element 10 becomes spring-loaded.

When the fluid pressure (P) is removed, the spring-loaded elastomeric material returns to an unloaded shape according to the memory of the material, the spring gap 46 re-opens, and the piston pressure sealing lip 34, the first angled surface 36, and the piston 35 return from the pressurized position of FIG. 3 to the relaxed position of FIG. 2. As should be understood, the amount of deflection of the piston pressure sealing lip 34 and the corresponding stroke of the piston 35 during a pressurization/depressurization cycle is substantially equal to the distance from the intermediate point 40 to the juncture of the second side wall 18 and the mouth 22 of the groove 14 (as seen in FIG. 2).

Preferably, and as seen in FIG. 1, the seal element 10 comprises a body portion 48 that generally defines the second angled surface 38, the second radial face 30, and a first base surface 50. As shown, the first base surface 50 extends from the second radial face 30 and faces generally toward the base wall 20 of the groove 14 when the seal element 10 is positioned within the groove 14. Also preferably, first and second branches 52, 54 extend from the body portion 48 and a third branch 56 extends from the first branch 52.

More particularly, the first branch 52 extends generally axially from the body portion 52 to the first radial face 24 and generally defines the first angled surface 36, the piston pressure sealing lip 34, and the portion of the first radial face 24 adjacent the piston pressure sealing lip 34. Preferably, the first branch 52 juts toward the first side wall 16 and out of the mouth 22 of the groove 14 such that the piston pressure sealing lip 34 sealingly engages the piston 35 when the seal element 10 is installed in the groove 14 and the piston 35 is positioned across the mouth 22 of the groove 14. Accordingly, when the seal element 10 is compressed by the piston 35, as seen in FIG. 2, the compression increases the sealing engagement of the piston pressure sealing lip 34 with the piston 35 and causes the first branch 52 to deflect toward the base wall 20 of the groove 14.

The second branch 54 extends generally axially from the body portion 48 to the first radial face 24 and generally defines a second base surface 58, the base wall pressure sealing lip 28, and the portion of the first radial face 24 adjacent the base wall pressure sealing lip 28. As shown, the second base surface 58 extends from the first base surface 50 to the base wall pressure sealing lip 28 and faces generally toward the base wall 20 of the groove 14 when the seal element 10 is positioned within the groove 14. Preferably, the second branch 54 juts toward the first side wall 16 and into contact with the base wall 20 of the groove 14 when the seal element 10 is installed in the groove 14. Accordingly, when the seal element 10 is compressed by the piston 35, the compression increases the sealing engagement of the base wall pressure sealing lip 28 with the base wall 20 and causes the second branch 54 to deflect toward the mouth 22 of the groove 14.

The third branch 56 extends generally radially from the distal end portion of the first branch 52 toward the distal end portion of the second branch 54. As seen in FIG. 1, the third branch defines at least a portion of the first radial face 24. Preferably, and as seen in FIG. 2, when the seal element 10 is positioned within the groove 14 and the piston 35 compresses the seal element 10 toward the base wall 20 of the groove 14, the distal end portion of the third branch 56 is generally radially forced into contact with the side of the distal end portion of the second branch 54. As seen, the body portion 48 and the first, second, and third branches 52, 54, 56 combine to define the crotch 26 extending inwardly with respect to the seal element 10 from the first radial face 24.

Preferably, and as seen in FIG. 1, the crotch 26 is defined by a first generally outwardly rounded crotch surface at the distal end portion of the third branch 56, a second generally linear crotch surface 62 at the side of the second branch 54, and a third generally inwardly rounded crotch surface 64 that extends between the first and second crotch surfaces 60, 62. As seen in FIG. 1, the body portion 48, the first branch 52, and the third branch 56 each define at least a portion of the third crotch surface 64.

As shown in FIG. 2, when the seal element 10 is installed within the groove 14 and the piston 35 compresses the seal element 10 toward the base wall 20 of the groove 14, and when the seal element 10 is un-pressurized, the first crotch surface 60 contacts the second crotch surface 62 at an initial position. As also shown in FIG. 2, the compression of the seal element 10 occurs mainly in two radial bands 66a, 66b (shown by the dashed lines of FIG. 2). As seen, band 66a extends generally through the body portion 48. As also seen, band 66b extends generally through the distal end portion of the first branch 52, through the third branch 52, past the contacted first and second crotch surfaces 60, 62, and through the distal end portion of the second branch 54.

When sufficient pressure (P) is applied, as seen in FIG. 3, the pressure (P) causes the first crotch surface 60 to slide against the second crotch surface 62 from the initial position and toward the second side wall 18 to a deflected position. As has been confirmed by testing, the configuration of the crotch 26 as set forth above allows the seal element 10 to achieve deflection beginning at about 100 PSI and to achieve maximum deflection with relatively low pressure on the order of about 1200 to 1800 PSI.

As depicted in FIG. 3, the pressure (P) has caused the first crotch surface 60 to lift off from the second crotch surface 62 at the deflected position. However, one skilled in the art will recognize that in other configurations of the seal element 10 the first crotch surface 60 may maintain contact with the second crotch surface 62 at the deflected position without departing from the spirit and scope of the present invention.

It may be appreciated that the amount of deflection and stroke that may be achieved by the seal assembly 11 and the piston 35 is dependent upon the shape of the groove 14, the crotch 26, and the spring gap 46, the angle $\alpha$ of the first angled surface 36, the angle $\alpha$ of the second angled surface 38, and the amount of fluid pressure applied to the piston 35 and the pressure side of the seal element 10, among other things. Moreover, the type and flexibility of the material employed to construct the seal element 10 and the various linear and angular dimensions of the seal element 10 also contribute to the amount of deflection and piston stroke achievable.

As an example, it has been found that a 0.122 inch deflection and piston stroke may be achieved with the groove 14 being 0.375 inches wide and 0.250 inches deep (the first distance); with the seal element 10 constructed of EPR elastomer and having an angle $\alpha$ of 22 degrees, an angle $\beta$ of 60 degrees, and a spring gap distance of 0.130 inches; and with the crotch 26 having a first crotch surface 60 with a radius of 0.041 inches over 160 degrees, and a third crotch surface having a radius of 0.045 inches over 200 degrees, when such a seal assembly 11 is pressurized to about 1800 PSI.

With the present invention as shown in FIGS. 1–3, a separate piston return spring is not required and the groove 14 is a standard seal groove requiring no special machining or shape. The spring seal assembly 11 of the present invention may be employed as a male or female seal assembly so long as the assembly 11 is stationary with respect to the piston housing 12.

From the foregoing description, it can be seen that the present invention comprises an improved fluid pressure activated piston return spring seal element for installation in a piston housing comprising an annular groove. It will be recognized by those skilled in the art that changes may be made to the above-described embodiment of the invention without departing from the broad inventive concepts thereof. It is understood, therefore, that this invention is not limited to the particular embodiment disclosed, but is intended to cover all modifications which are within the spirit and scope of the appended claims.

I claim:

1. An improved fluid pressure activated piston return spring seal element for installation in a piston housing comprising an annular groove having in toroidal cross-section first and second generally parallel radial side walls, an axial base wall extending between the first and second side walls, and a mouth, the spring seal element being formed of an elastomeric material and having a generally annular shape, an axis, a radial face defining a pressure side of the seal element and for facing toward the first side wall of the groove, and an axial face for facing toward and partially protruding through the mouth of the groove, the seal element further having in toroidal cross-section:

a body portion;

a first branch extending generally axially from the body portion and having a distal end portion defining at least a portion of the radial face and the axial face, the first branch having a piston pressure sealing lip for extending outside the mouth of the groove and sealingly engaging a piston when the piston is positioned in the housing and across the mouth of the groove;

a second branch extending generally axially from the body portion and having a distal end portion defining at least a portion of the radial face, the second branch having a base wall pressure sealing lip for sealingly engaging the base wall; and a third branch extending generally radially from the distal end portion of the first branch toward the distal end portion of the second branch, and defining at least a portion of the radial face, the body portion and the first, second, and third branches defining a crotch region extending inwardly with respect to the seal element from the radial face.

2. The spring seal element as recited in claim 1 wherein the third branch has a distal end portion, and wherein the crotch region is defined by a first generally outwardly rounded crotch surface at the distal end portion of the third branch, a second generally linear crotch surface on a side of the second branch, and a third generally inwardly rounded crotch surface extending between the first and second crotch surfaces, the first crotch surface being in contact with the second crotch surface at an initial position when the element is installed in the piston housing with the piston positioned in the housing and across the mouth of the groove, and with the seal element un-pressurized.

3. The spring seal element as recited in claim 1 in combination with the piston housing and the piston, the seal element being installed in the piston housing and the piston being positioned in the housing and across the mouth of the groove, the body portion and the second side wall forming a spring gap therebetween opening toward the mouth of the groove when the seal element is in an un-pressurized initial position, the spring gap substantially closing and the piston moving with the axial face when sufficient fluid pressure is applied to the pressure side of the element and to the piston, the seal element urging the piston to move with the axial face back to the initial position and the spring gap re-opening when the pressure is removed.

4. The spring seal element as recited in claim 1 wherein the axial face and the radial face meet at the piston pressure sealing lip.

5. An improved fluid pressure activated piston return spring seal element for installation in a piston housing comprising an annular groove having in toroidal cross-section first and second generally parallel radial side walls, an axial base wall extending between the first and second side walls, and a mouth, the seal element being formed of an elastomeric material and having a generally annular shape and an axis, the seal element further having in toroidal cross-section:

a first radial face for facing the first side wall, the first radial face defining a pressure side of the seal element and a crotch region extending inwardly with respect to the seal element, the first radial face including a base wall pressure sealing lip for sealingly engaging the base wall;

a second radial face situated opposite the first radial face for facing the second side wall; and an axial face for facing toward and partially protruding through the mouth of the groove, the axial face including:

a piston pressure sealing lip for extending outside the mouth of the groove and sealingly engaging a piston when the piston is positioned in the housing and across the mouth of the groove, the piston pressure sealing lip being proximate the first radial face;

a first angled surface extending from the piston pressure sealing lip in a direction generally toward the second radial face to an intermediate point, the first angled surface extending at a first angle with respect to the axis of the seal element, the intermediate point for being proximate the mouth of the groove; and a second angled surface extending from the intermediate point in a direction generally toward the second radial face, the second angled surface extending at a second angle with respect to the axis of the seal element, the second angle being larger than the first angle, the second angled surface and the second side wall forming a spring gap therebetween, the spring gap substantially closing when sufficient fluid pressure is applied to the pressure side of the seal element to move the piston from an initial position, the spring gap re-opening when the pressure is removed and the seal element urges the piston to move back to the initial position.

6. The spring seal element as recited in claim 5 wherein the second angled surface extends from the intermediate point to the second radial face.

7. The spring seal element as recited in claim 5 wherein the seal comprises:

a body portion;

a first branch extending generally axially from the body portion and having a distal end portion defining at least a portion of the first radial face and the axial face and having the piston pressure sealing lip;

a second branch extending generally axially from the body portion and having a distal end portion defining at least a portion of the first radial face, the second branch having the base wall pressure sealing lip; and a third branch extending generally radially from the distal end portion of the first branch toward the distal end portion of the second branch, and defining at least a portion of the first radial face, the body portion and the first, second, and third branches defining the crotch region extending inwardly with respect to the seal element from the first radial face.

8. The spring seal element as recited in claim 7 wherein the third branch has a distal end portion, and wherein the crotch region is defined by a first generally outwardly rounded crotch surface at the distal end portion of the third branch, a second generally linear crotch surface on a side of the second branch, and a third generally inwardly rounded crotch surface extending between the first and second crotch surfaces, the first crotch surface being in contact with the second crotch surface at an initial position when the element is installed in the piston housing with the piston positioned in the housing and across the mouth of the groove, and with the seal element un-pressurized.

9. The spring seal element as recited in claim 5 wherein the first angled surface and the first radial face meet at the piston pressure sealing lip.

\* \* \* \* \*